United States Patent [19]

Akita et al.

[11] 4,215,575

[45] Aug. 5, 1980

[54] APPARATUS FOR MEASURING TEMPERATURE OF ULTRASONIC WAVE PROPAGATION MEDIUM

[75] Inventors: Sigeyuki Akita, Aichi; Hisato Wakamatsu, Toyota, both of Japan

[73] Assignee: Nippon Soken, Inc., Nishio, Japan

[21] Appl. No.: 957,194

[22] Filed: Nov. 2, 1978

[30] Foreign Application Priority Data

Jan. 27, 1978 [JP] Japan .................................. 53-8643
Jan. 31, 1978 [JP] Japan .................................. 53-9568

[51] Int. Cl.$^2$ ......................................... G01K 11/24
[52] U.S. Cl. ................................................. 73/339 A
[58] Field of Search ...................... 73/339 A, 590, 579

[56] References Cited

U.S. PATENT DOCUMENTS

| | | | |
|---|---|---|---|
| 3,320,808 | 5/1967 | Boyd et al. ........................ | 73/339 A |
| 3,501,956 | 3/1970 | Yamaga et al. .................... | 73/339 A |
| 3,631,340 | 12/1971 | Miller ................................ | 324/83 A |
| 4,061,415 | 12/1977 | Taenzer ............................. | 73/620 X |

Primary Examiner—Jerry W. Myracle
Attorney, Agent, or Firm—Cushman, Darby & Cushman

[57] ABSTRACT

An ultrasonic wave signal transmitted from an ultrasonic wave transmitter and propagating through an ultrasonic wave propagation medium is received by two ultrasonic wave receivers disposed in a sensor part in a relation spaced apart by a predetermined distance from each other in the direction of transmission of the signal. The sensor part generates a detected phase difference signal having a pulse width corresponding to the phase difference between the ultrasonic wave signal received by one of the two receivers and that received by the other receiver. This detected phase difference signal is applied to a measuring/display part which generates a pulse signal having the number of pulses corresponding to the detected phase difference, and an up/down counter counts the number of pulses of this pulse signal. On the basis of the result of counting by the counter, the temperature of the medium between the transmitter and the receivers is measured and displayed on a display.

6 Claims, 18 Drawing Figures

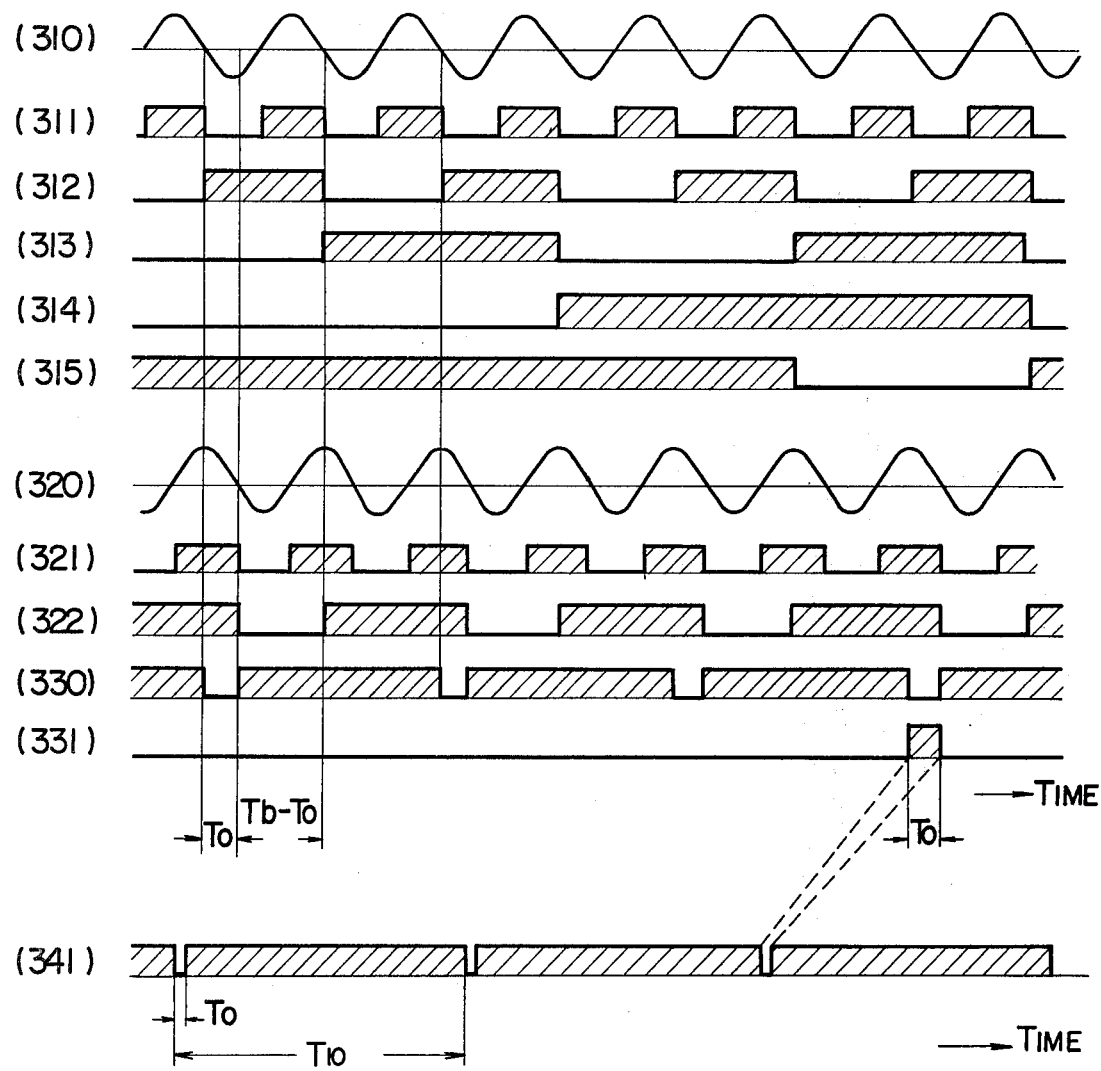

→ TIME

APPARATUS FOR MEASURING TEMPERATURE OF ULTRASONIC WAVE PROPAGATION MEDIUM

FIELD OF THE INVENTION

This invention relates to an apparatus for measuring the temperature of an ultrasonic wave propagation medium such as air utilizing the fact that the sound wave propagation velocity of such a propagation medium varies depending on the temperature.

SUMMARY OF THE INVENTION

It is an object of the present invention to provide an apparatus capable of accurately and stably measuring the temperature of an ultrasonic wave propagation medium between ultrasonic wave signal transmitting and receiving means regardless of the propagation distance of the ultrasonic wave signal through the propagation medium whose temperature is to be measured, that is, the distance between the ultrasonic wave signal transmitting and receiving means.

The present invention which attains the above object comprises one ultrasonic wave signal transmitter continuously transmitting an ultrasonic wave signal, two ultrasonic wave signal receivers spaced apart by a predetermined distance from each other in the direction of transmission of the signal for continuously receiving the ultrasonic wave signal transmitted from the transmitter and propagating through an ultrasonic wave propagation medium whose temperature is to be measured, and means for detecting the temperature of the propagation medium on the basis of the phase difference between the ultrasonic wave signal received by one of the receivers and that received by the other receiver.

Another object of the present invention is to provide an apparatus capable of accurately and stably measuring the temperature of an ultrasonic wave propagation medium whose temperature is to be measured and displaying the temperature of the propagation medium at a location remote from the location of temperature measurement.

The present invention which attains the above object comprises a sensor part including one ultrasonic wave signal transmitter continuously transmitting an ultrasonic wave signal, two ultrasonic wave signal receivers spaced apart by a predetermined distance from each other in the direction of transmission of the signal for receiving the ultrasonic wave signal transmitted from the transmitter and propagating through an ultrasonic wave propagation medium whose temperature is to be measured, and means for detecting the phase difference between the ultrasonic wave signal received by one of the receivers and that received by the other receiver thereby generating a detected phase difference signal, and a measuring/display part including means for modulating a high frequency signal by the detected phase difference signal applied from the sensor part, means for counting the number of pulses of the modulated pulse signal, and means for measuring and displaying the temperature of the propagation medium on the basis of the count of the counting means.

Still another object of the present invention is to provide an apparatus capable of accurately and stably measuring the temperature of an ultrasonic wave propagation medium between a freely selected reflector and ultrasonic wave signal transmitting and receiving means without any limitation in the position of measurement of the temperature of the propagation medium.

The present invention which attains the above object comprises one ultrasonic wave signal transmitter continuously transmitting an ultrasonic wave signal, a first and a second ultrasonic wave signal receivers spaced apart by a predetermined distance from each other in the direction of transmission of the signal for receiving the ultrasonic wave signal transmitted from the transmitter and propagating through an ultrasonic wave propagation medium whose temperature is to be measured, and means for detecting the variation in the sound wave propagation velocity thereby measuring the temperature of the propagation medium on the basis of the phase difference between the ultrasonic wave signal received by the first receiver and that received by the second receiver after the signal level has been stabilized, wherein the first and second receivers are disposed on the same side as the transmitter to receive the ultrasonic wave signal transmitted from the transmitter and reflected back from a reflector, and the ultrasonic wave signal transmitted from the transmitter has a period longer than the length of time required for the reflected ultrasonic wave signal to arrive at the receivers.

These and other objects features and advantages of the present invention will be apparent from the following detailed description taken in conjunction with the accompanying drawings.

BRIEF DESCRIPTION OF THE DRAWINGS

FIG. 3 is a waveform diagram showing operating waveforms appearing at various parts of the apparatus shown in FIG. 1.

DESCRIPTION OF THE PREFERRED EMBODIMENTS

A preferred embodiment of the apparatus according to the present invention will now be described with reference to FIGS. 1 to 8.

Figure 1:
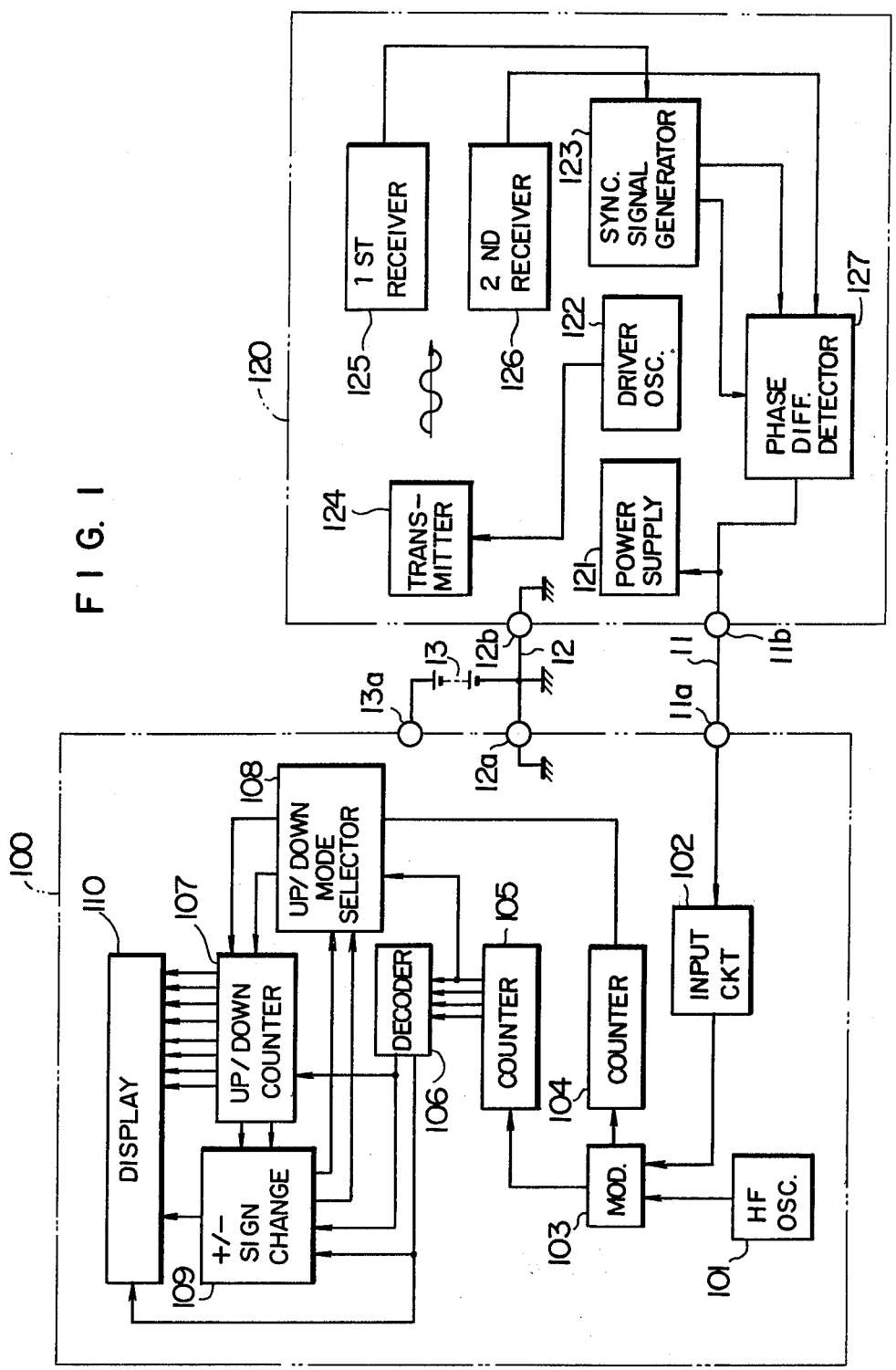
FIG. 1 is a block diagram showing the general structure of an embodiment of the apparatus according to the present invention.

Referring first to FIG. 1 which is a block diagram showing the general structure of the first embodiment, the block 100 designates a measuring/display part which is energized by a battery 13 supplying a D.C. voltage to an input terminal 13a. The block 120 designates a sensor part. The measuring/display part 100 is connected to the sensor part 120 by a signal line 11 and a grounding line 12, and the signal line 11 serves to apply the information output signal of the sensor part 120 to the measuring/display part 100 and also to supply required power to electronic components of the sensor part 120.

The measuring/display part 100 comprises a high-frequency oscillator 101 oscillating at a predetermined high frequency, an input circuit 102 receiving a detected phase difference signal applied from the sensor part 120, and a modulator circuit 103 modulating the high-frequency oscillation output signal of the oscillator 101 by the detected phase difference signal applied from the sensor part 120 to the input circuit 102.

The modulator circuit 103 is connected to an accumulation counter circuit 104 which generates an output pulse each time it counts a predetermined number of pulses of the modulated pulse signal. The modulator circuit 103 is also connected to a time counter circuit 105 which generates an output pulse at a constant time interval, and this constant time signal is applied to a decoder circuit 106 which decodes the input to produce a store signal and a clear signal. An up/down counter circuit 107 counts the output pulses of the accumulation counter circuit 104. An up/down mode selector circuit 108 acts to selectively apply the output pulses of the accumulation counter circuit 104 to the count-up and count-down terminals of the up/down counter circuit 107 depending on whether the temperature of an ultrasonic wave propagation medium such as air in plus or minus. A +/− sign change circuit 109 discriminates whether the temperature of air is plus or minus, and selects the sign "+" or "−" to be displayed on a display circuit 110 which displays the temperature of air.

The sensor part 120 comprises a regulated power supply circuit 121 connected to the signal line 11 for producing power required by electronic components of the sensor part 120. A driver oscillator circuit 122 produces a drive frequency of, for example, 40 kHz for driving an ultrasonic wave resonator in an ultrasonic wave signal transmitter unit 124 which transmits continuously an ultrasonic wave signal which is received by a first ultrasonic wave signal receiver unit 125 and a second ultrasonic wave signal receiver unit 126 spaced apart from each other by a predetermined distance in the direction of transmission of the ultrasonic wave signal. A synchronizing signal generator circuit 123 generates a synchronizing signal used for the detection of the phase difference between the ultrasonic wave signal received by the first receiver unit 125 and that received by the second receiver unit 126. A phase difference detector circuit 127 detects the phase difference between the signal received by the first receiver unit 125 and that received by the second receiver unit 126 in response to the application of the synchronizing signal from the synchronizing signal generator circuit 123.

The detailed structure and operation of the measuring/display part 100 and sensor part 120 shown in FIG. 1 will be described with reference to FIGS. 2A and 2B which are electrical connection diagrams of the first embodiment of the apparatus according to the present invention.

Figure 2A:
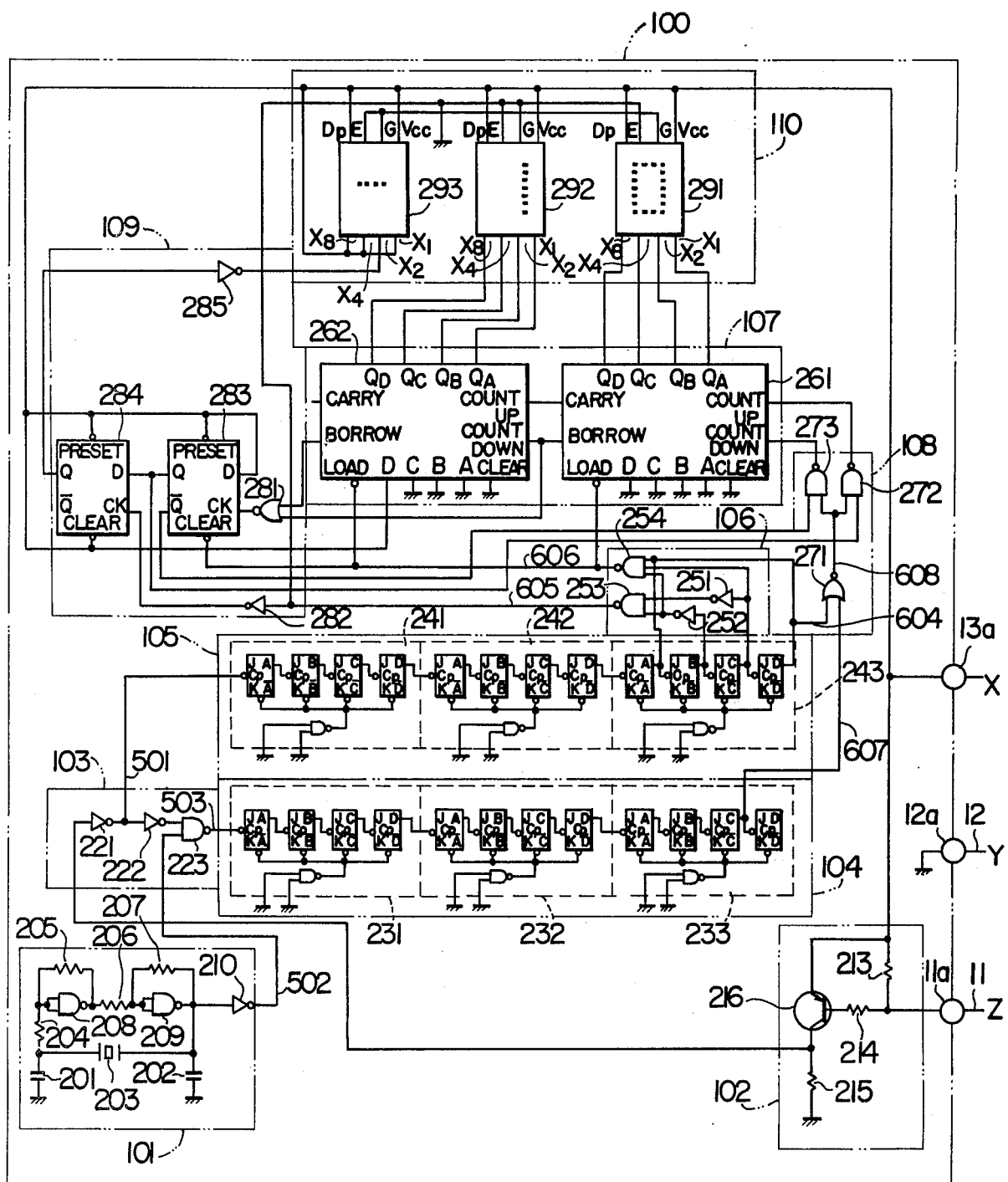
FIGS. 2A and 2B are electrical connection diagrams showing the detailed circuit structure of the blocks shown in FIG. 1.
Figure 2B:
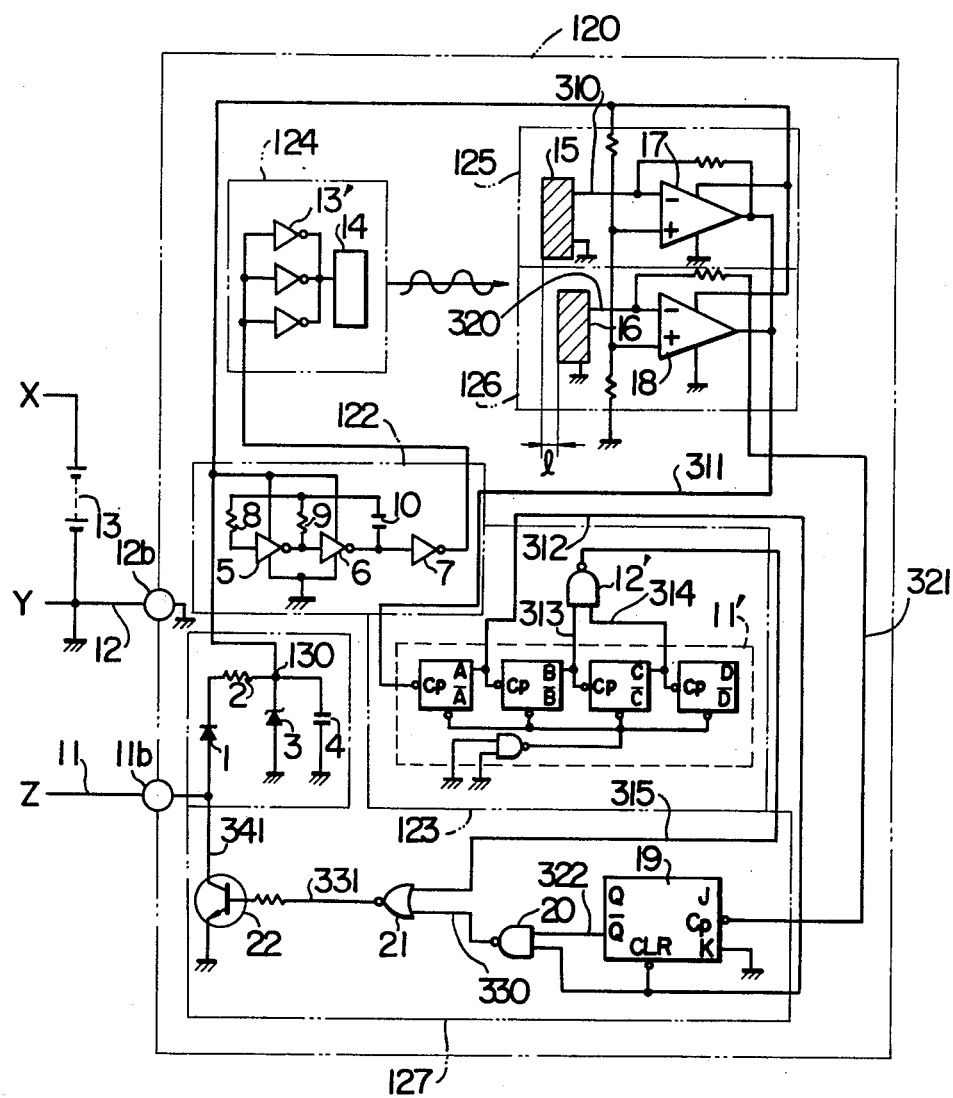

Referring first to FIG. 2B showing the detailed structure of the sensor part 120, the driver oscillator circuit 122 is a known CR oscillation circuit composed of inverter gates 5, 6 and 7, resistors 8 and 9, and a capacitor 10. The oscillation pulse signal produced in this circuit 122 is subjected to waveform reshaping by the inverter gate 7 and is then applied to the ultrasonic wave signal transmitter unit 124 to drive an ultrasonic wave resonator of a transmitter 14 through three parallel-connected inverter gates 13'. This transmitter 14 and receivers 15 and 16 in the first and second receiver units 125 and 126 are those commonly known and employed in the field of ultrasonic wave transmission and reception.

The ultrasonic wave signal transmitted from the transmitter 14 is received by the first and second receivers 15 and 16 spaced apart by a predetermined distance in the direction of transmission of the signal, and a signal (310) as shown in FIG. 3 appears on an output line 310 of the first receiver 15. This signal (310) is amplified by an amplifier 17, and a signal (311) as shown in FIG. 3 appears on an output line 311 of the amplifier 17. This output signal (311) of the first receiver 15 is applied to the synchronizing signal generator circuit 123 including a frequency divider circuit 11', and a $\frac{1}{2}$ frequency-divided signal (312), a $\frac{1}{4}$ frequency-divided signal (313) and a $\frac{1}{8}$ frequency-divided signal (314) as shown in FIG. 3 appear on output lines 312, 313 and 314 of the first, second and third stages respectively of the frequency divider circuit 11'. The signals (313) and (314) among the divider stage output signals are applied to a NAND gate 12', and a signal (315) as shown in FIG. 3 appears on an output line 315 of the NAND gate 12'. This signal (315) is applied to the phase difference detector circuit 127 together with the aforementioned signal (312).

On the other hand, an output signal (320) the phase of which differs from that of the output signal 310 of the first receiver 15 appears on an output line 320 of the second receiver 16 and has a waveform as shown in FIG. 3. This signal (320) is amplified by an amplifier 18, and a signal (321) as shown in FIG. 3 appears on an output line 321 of the amplifier 18. The output signal (321) of the second receiver 16 is applied to the clock input terminal CP of a J-K flip-flop 19 in the phase difference detector circuit 127. Since the signal (312) shown in FIG. 3 is applied to the clear terminal of this J-K flip-flop 19, a signal (322) as shown in FIG. 3 appears on a line 322 connected to the $\overline{Q}$ output terminal of the flip-flop 19. This output signal (322) is applied to a NAND gate 20 together with the signal (312) obtained by dividing the frequency of the output signal (311) of the first receiver 15 by the factor of two. Consequently, an output signal (330), as shown in FIG. 3, representing the phase difference $T_o$ between the output signal (311) of the first receiver 15 and the output signal (321) of the second receiver 16 appears on an output line 330 of the NAND gate 20.

Figure 4A:
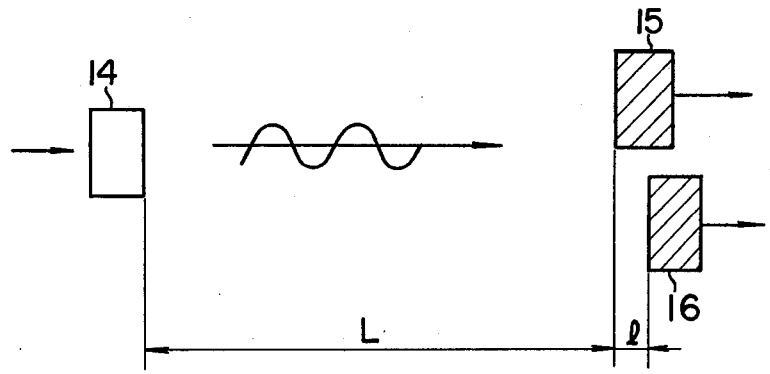
FIGS. 4A and 4B illustrate the basic principle of temperature detection according to the present invention.
Figure 4B:
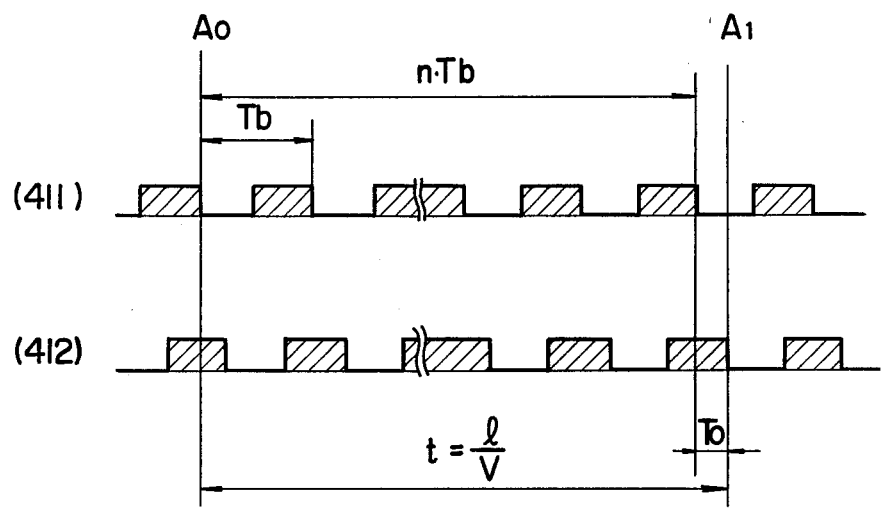

This phase difference $T_o$ will be described with reference to FIGS. 4A and 4B. In FIG. 4A, the first and second receivers 15 and 16 are shown spaced apart from each other by a predetermined distance l. In FIG. 4B, the ultrasonic wave signal transmitted from the transmitter 14 and received by the first and second receivers 15 and 16 is shown by (411) and (412) respectively. The first receiver 15 receives the transmitted ultrasonic wave signal at time $A_o$, and the second receiver 16 receives the same signal at time $A_l$. Thus, the length of time t required for propagation of the ultrasonic wave signal from time $A_o$ to time $A_l$ is given by $t=1/v$ where v is the velocity of sound in the propagation medium which is air in this case. During this length of time t, the first receiver 15 receives n (n=0, 1, 2, 3 ... ) pulses of the transmitted ultrasonic wave signal. Therefore, the phase difference between the ultrasonic wave signal (411) received by the first receiver 15 and the ultrasonic wave signal (412) received by the second receiver 16, that is, the phase difference $T_o$ between these two pulse signals is given by $T_o = 1/v - n \cdot T_b$ where $T_b$ is the pulse interval. It is seen from this equation that the phase difference $T_o$ varies in relation to the velocity v of sound in the propagation medium, and therefore, the phase difference $T_o$ varies depending on the temperature of air since the sound velocity v varies depending on the temperature of air. Thus, the temperature of air can be measured on the basis of the detected value of the phase difference $T_o$ when the values of l, n and Tb are so determined that the detected value of the phase difference $T_o$ corresponds to the variation in the temperature of air while maintaining a predetermined relation therebetween. Suppose that the first receiver 15 is spaced apart from the transmitter 14 by a distance L which is very large compared with the distance l between the first and second receivers 15 and 16. Then, the length of time $t_1$ given by $t_1 = L/v$ is required until the ultrasonic wave signal transmitted from the transmitter 14 is received by the first receiver 15. Similarly, the length of time $t_2$ given by $t_2 = (L+l)/v$ is required until that signal is received by the second receiver 16. Consequently, there is a time difference $t_0$ given by $t_0 = t_2 - (L+l)/v - L/v = 1/v = t$ between the lengths of time $t_2$ and $t_1$ required until the ultrasonic wave signal transmitted from the transmitter 14 is received by the second and first receivers 16 and 15 respectively. This $t_0$ is independent of the distance L between the transmitter 14 and the first receiver 15. It can be therefore seen that the temperature of the propagation medium between the transmitter 14 and the first and second receivers 15 and 16 can be measured independently of the distance L according to the present invention.

The detected phase difference signal (330) shown in FIG. 3 is to be applied directly from the sensor part 120 to the measuring/display part 100 by way of the signal line 11. However, the signal line 11 in the present embodiment serves not only to transmit this detected phase difference signal but also to provide power required by the electronic components of the sensor part 120. Thus, this detected phase difference signal (330) and the output signal (315) (FIG. 3) of the NAND gate 12' are applied to a NOR gate 21, so that a pulse (331) representing the phase difference $T_o$ as shown in FIG. 3 appears on an output line 331 of the NOR gate 21 at an interval of four pulses of the signal (330). This signal (331) is applied to the base of a transistor 22, and a signal (341) as shown in FIG. 3 appears at an output terminal 11b connected by a line 341 to the collector of the transistor 22. The time axis of this signal (341) is depicted in a reduced scale in FIG. 3, and actually, the time interval $T_o$ of this signal (341) is equal to the time interval $T_o$ of the signal (330) and also to the pulse width $T_o$ of the signal (331) shown in FIG. 3.

The signal (341) (FIG. 3) appearing at the output terminal 11b is applied to the regulated power supply circuit 121 composed of a diode 1, a resistor 2, a zener diode 3 and a capacitor 4 to provide a dc power supply voltage required for the operation of the electronic components of the sensor part 120 as described previously. The potential at a power supply line 130 is prevented from an excessive drop by the reverse-flow preventive diode 1 and the charged capacitor 4 even in the conducting state of the transistor 22, since the pulse interval $T_{10}$ of the signal (341) shown in FIG. 3 is quite large compared with the time interval $T_o$ and thus the capacitor 4 is charged sufficiently by the battery 13 through the line 11 during the OFF time $(T_{10} - T_o)$ of the transistor 22.

The detected phase difference signal (341) is applied by way of the signal line 11 to an input terminal 11a of the measuring/display part 100. The input circuit 102 composed of resistors 213-215 and a transistor 216 extracts this detected phase difference signal (341), and a detected phase difference signal (501) as shown in FIG. 5 appears on an output line 501 of an inverter gate 221 in the modulator circuit 103.

Figure 5:
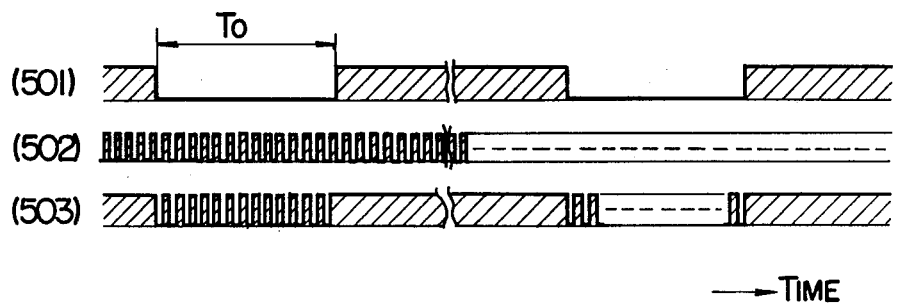
FIGS. 5, 6, 7 and 8 are signal waveform diagrams illustrating the operation of the apparatus shown in FIG. 1.
Figure 6:
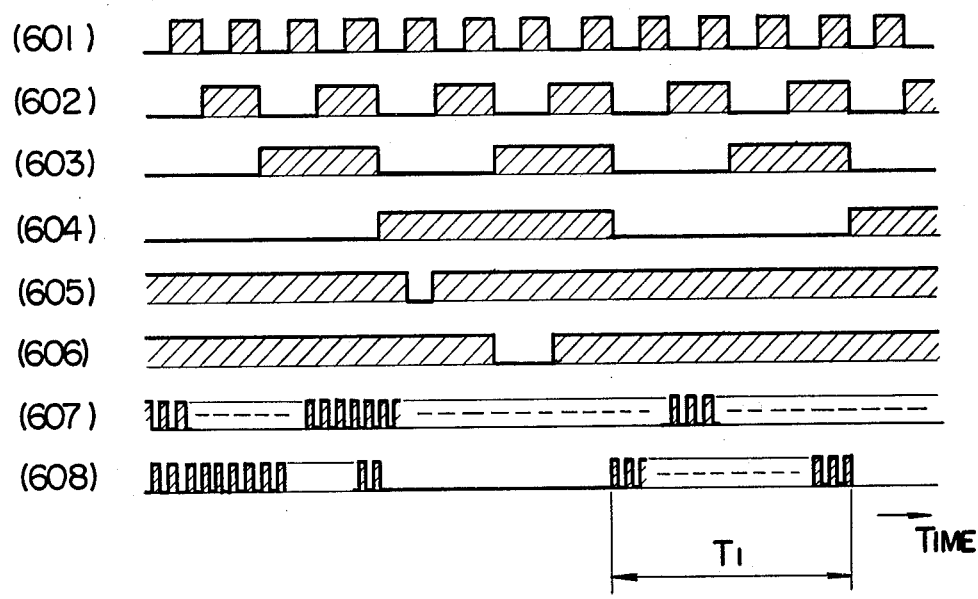

The signal (501) shown in FIG. 5 is the same as the signal (341) shown in FIG. 3, except that the time interval $T_o$ is depicted in an enlarged scale. A high-frequency oscillation output signal (502) of predetermined frequency generated by the high-frequency oscillator circuit 101 composed of elements 201-210 and appearing on an output line 502 is modulated by the signal (501), and a modulated pulse signal (503) including the high-frequency pulses in the time interval $T_o$ of the signal (501) appears on an output line 503 of a NAND gate 223 in the modulator circuit 103. It will be apparent that a variation in the phase difference $T_o$ due to a variation in the temperature of air results in a corresponding variation in the number of high-frequency pulses included in the time interval $T_o$. It will also be apparent that, with the increase in the frequency of the high-frequency oscillation signal (502), the number of the high-frequency pulses in the time interval $T_o$ is increased to improve the accuracy of detection of the phase difference $T_o$. The output signal (501) of the inverter gate 221 is applied to the time counter circuit 105 which counts $2^m$ pulses ($2^{12}$ pulses herein) of the input pulse signal (501) to provide a constant time signal. Signals (601), (602), (603) and (604) shown in FIG. 6 represent the output signals of the $2^{m-3}$, $2^{m-2}$, $2^{m-1}$ and $2^m$ terminals of this counter circuit 105 respectively. These signals (601), (602), (603) and (604) are applied to the decoder circuit 106 composed of inverter gates 251, 252 and NAND gates 253, 254 to be decoded, and a store signal (605) as shown in FIG. 6 appears on an output line 605 of the NAND gate 253, while a clear signal (606) as shown in FIG. 6 appears on an output line 606 of the NAND gate 254. The signal (604) is also applied to one of the input terminals of a NOR gate 271 in the up-/down mode selector circuit 108 by way of an input line 604, and an output signal (607) of the accumulation counter circuit 104 generating an output pulse at an interval of $2^{m-1}$ pulses of the modulated pulse signal (503) is applied to the other input terminal of the NOR gate 271. Consequently, an output signal (608) as shown in FIG. 6 appears on an output line 608 of the NOR gate 271. It will be apparent that the number of pulses in the time interval $T_l$ of the signal (608) shown in FIG. 6 is proportional to the number of pulses in the time interval $T_o$ of the modulated pulse signal (503) shown in FIG. 5.

It is to be noted however that the pulses of the modulated pulse signal (503) are counted over a length of time $t_a$, proportional to the pulse interval $T_{10}$ of the detected phase difference signal (341), i.e., during the time during which the signal (341) appears m times, so that the number of pulses in this time interval $T_I$ represents the mean value of the phase difference $T_o$ during this length of time $t_a$.

Figure 7:
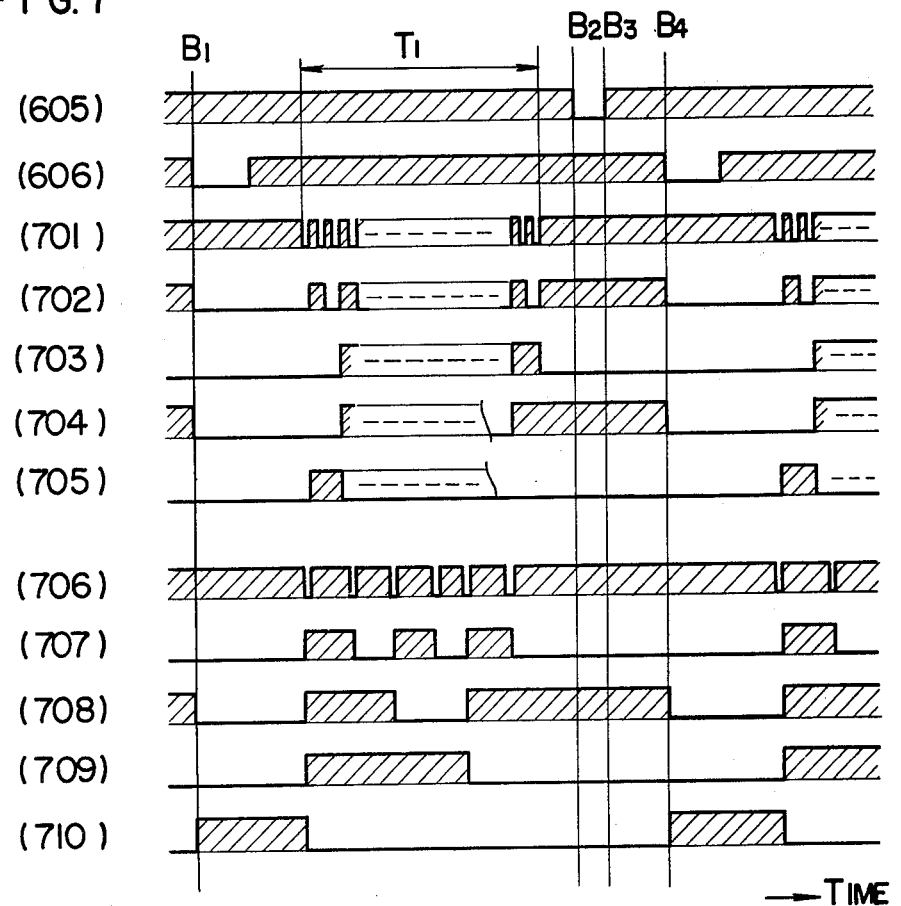

The clear signal (606) appearing on the output line 606 of the NAND gate 254 in the decoder circuit 106 is applied to the clear terminal of a D flip-flop 283 in the +/− sign change circuit 109 to restore this flip-flop 283 to the original state, and as a result, an output signal of "0" level appears from its Q output terminal, while an output signal of "1" level appears from its $\overline{Q}$ output terminal. The signal of "0" level and the signal of "1" level are applied respectively to NAND gates 272 and 273 in the up/down mode selector circuit 108 to close the NAND gate 272 and to open the NAND gate 273. Consequently, an output signal (701) as shown in FIG. 7 appears from the NAND gate 273. This signal (701) is applied to the countdown terminal of an up/down counter 261 in the up/down counter circuit 107. This up/down counter 261 may be a decade up/down counter of, for example, model SN 74192 manufactured by the Texas Instruments Corporation in U.S.A. One pulse appears at the borrow terminal of this up/down counter 261 each time it counts ten pulses of the signal (701) applied to the count-down terminal. This output signal appearing at the borrow terminal of the up/down counter 261 is applied to the count-down terminal of a succeeding up/down counter 262, so that the count of the up/down counter 261 represents the "units" digit of a displayed numeral, and the count of the up/down counter 262 represents the "tens" digit of the displayed numeral. The same applies to the count-up operation in response to the application of the output signal of the NAND gate 272 to the count-up terminal of the up/down counter 261.

In the embodiment shown in FIGS. 2A and 2B, all the data input terminals A, B, C and D of the up/down counter 261 are set at the "0" level, and the data input terminals A, B and C of the up/down counter 262 are set at the "0" level, except that its data input terminal D is set at the "1" level. This means that the data set in the up/down counter circuit 107 corresponds to a decimal number "80". In response to the application of successive pulses of the signal (701) to the count-down terminal of the up/down counter 261, the output of the up/down counter circuit 107 varies in the order of "79"→"78"→"77"... When the clear signal (606) shown in FIG. 7 is applied to the load terminals of the counters 261 and 262 at time $B_1$, output signals of "0" level appear at all the output terminals $Q_A$, $Q_B$, $Q_C$ and $Q_D$ of the counter 261, and output signals of "0" level appear also at three output terminals $Q_A$, $Q_B$ and $Q_C$ of the counter 262, while an output signal of "1" level appears at the remaining output terminal $Q_D$ of the counter 262. In response to the application of the output signal (701) of the NAND gate 273 to the countdown terminal of the counter 261, output signals (702), (703), (704) and (705) as shown in FIG. 7 appear at the respective output terminals $Q_A$, $Q_B$, $Q_C$ and $Q_D$ of the counter 261, and in response to the application of the signal (706) appearing at the borrow terminal of the counter 261 to the count-down terminal of the counter 262, output signals (707), (708), (709) and (710) as shown in FIG. 7 appear at the respective output terminals $Q_A$, $Q_B$, $Q_C$ and $Q_D$ of the counter 262.

Suppose now that 55 pulses are included in the time interval $T_1$ of the signal (701), then, the output of the up/down counter circuit 107 between time $B_2$ and time $B_3$ should represent "80"−"55"="25". Thus, output signals of "1" level, "0" level, "1" level and "0" level appear at the respective output terminals $Q_A$, $Q_B$, $Q_C$ and $Q_D$ of the counter 261, and output signals of "0" level, "1" level, "0" level and "0" level appear at the respective output terminals $Q_A$, $Q_B$, $Q_C$ and $Q_D$ of the counter 262. These output signals are applied to the corresponding input terminals of light-emitting diode type display units 291 and 292 disposed in the display circuit 110 to display the "units" digit and "tens" digit respectively. These display units 291 and 292 may be light-emitting diode type display of model 7300 manufactured by the Yokogawa-Hewlett-Packard Co., Ltd. in Japan.

The store signal (605) shown in FIG. 7 is applied to the enable terminals of these display units 291 and 292. The light-emitting diodes in the display units 291 and 292 are energized by the coded input signals applied during the "0" level of the store signal (605), and that state is stored in the display units 291 and 292. Thus, the display units 291 and 292 display the numerals "5" and "2" respectively to indicate that the temperature of air which is the medium to be measured is now 25° C. At time $B_4$ in FIG. 7, the counters 261 and 262 are set in their initial state and operate in the same manner as that described hereinbefore in response to the application of the input signal (701) so that the temperature corresponding to the outputs of the counters 261 and 262 can be displayed on the display units 291 and 292. Thus, suppose, for example, that the temperature of air to be measured rises to narrow the time interval $T_o$ of the detected phase difference signal (341) shown in FIG. 3, and 25 pulses are included in the time interval $T_1$ of the signal (701) shown in FIG. 7. Then, output signals of "1" level, "0" level, "1" level and "0" level appear at the respective output terminals $Q_A$, $Q_B$, $Q_C$ and $Q_D$ of the counter 261, and output signals of "1" level, "0" level, "1" level and "0" level appear at the respective output terminals $Q_A$, $Q_B$, $Q_C$ and $Q_D$ of the counter 262 between time $B_2$ and $B_3$ in FIG. 7, so that the output of the up/down counter circuit 107 should now represent "80"−"25"="55". Thus, the display units 291 and 292 display the numerals "5" and "5" respectively, to indicate that the temperature of air is now 55° C.

Consider now the case in which the temperature of air to be measured drops to a minus value in degrees centigrade. It will be apparent from the aforementioned equation $T_o = (1/v) - n \cdot T_b$ that the time interval $T_o$ of the detected phase difference signal (341) shown in FIG. 3 increases in such a case. Suppose, for example, that the output signal (608) (FIG. 8) of the NOR gate 271, to which the output signal (607) of the accumulation counter circuit 104 counting the pulses of the modulated pulse signal (503) is applied, includes 99 pulses in the time interval $T_2$ which is equal to the time interval $T_1$ in FIG. 7. At time $C_1$ in FIG. 8, an output signal (801) of the NAND gate 273 is applied to the count-down terminal of the counter 261, and output signals (803), (804), (805), (806), (807) and (811), (812), (813), (814) as shown in FIG. 8 appear from the counters 261 and 262 respectively in a manner as described hereinbefore.

At time $C_2$ at which 80 pulses have been applied to the count-down terminal of the counter 261, the count of the up/down counter circuit 107 is "80"−"80"="0", and output signals of "0" level appear at all the output terminals of the counters 261 and 262. A signal (815) as shown in FIG. 8 appears at the borrow terminal of the "tens-digit" display counter 262. This signal (815) is applied to a NOR gate 281 in the +/− sign change circuit 109 together with the signal (807) appearing at the borrow terminal of the "units-digit" display counter 261, and an output signal (820) having its "1" level at time $C_2$ as shown in FIG. 8 appears from the NOR gate 281. This signal (820) is applied to the clock terminal of the D flip-flop 283 so that an output signal of "1" level appears at the Q output terminal of the flip-flop 283 and an output signal of "0" level appears at its $\overline{Q}$ output terminal. Consequently, the NAND gates 272 and 273 in the up/down mode selector circuit 108 are opened and closed respectively. Thus, a pulse signal (802) as shown in FIG. 8 appears from the NAND gate 272. This signal (802) is applied to the count-up terminal of the counter 261 at time $C_2$ with the result that the output signals of the counters 261 and 262 start to increase in proportion to the number of input pulses. In the time interval between time $C_3$ and $C_4$, output signals of "1" level, "0" level, "0" level and "1" level appear at the respective output terminals $Q_A$, $Q_B$, $Q_C$ and $Q_D$ of the counter 261, and output signals of "1" level, "0" level, "0" level and "0" level appear at the respective output terminals $Q_A$, $Q_B$, $Q_C$ and $Q_D$ of the counter 262 to indicate"80"−"99"="−19". The "units-digit" and "tens-digit" display unis 291 and 292 display now the numerals "9" and "1" respectively.

Figure 8:
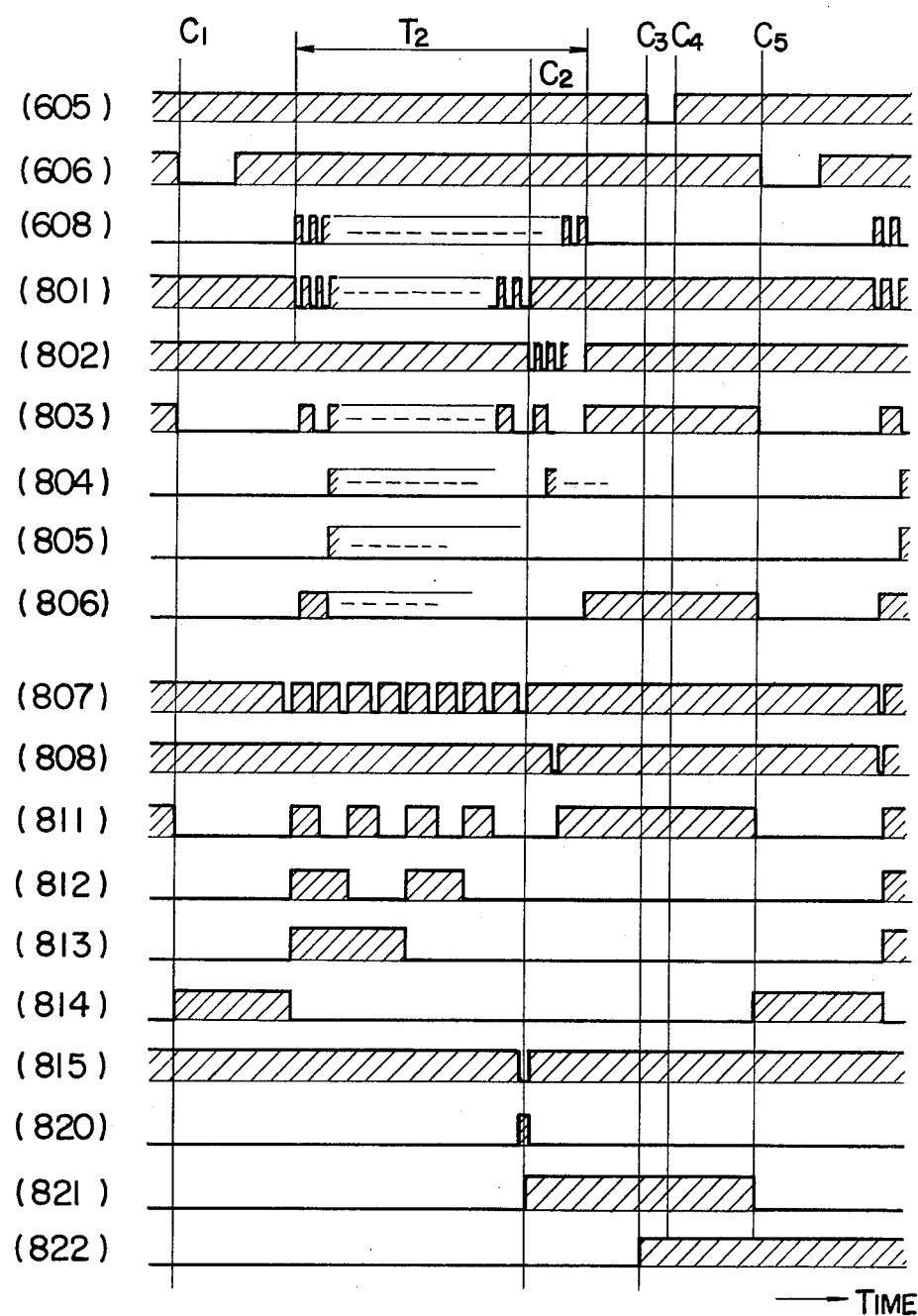

The Q output signal (821) of the D flip-flop 283 having its "1" level from time $C_2$ as shown in FIG. 8 is applied to the D terminal of a succeeding D flip-flop 284 in the +/− sign change circuit 109, and the store signal (605), which is the output of the NAND gate 253 in the decoder circuit 106, is applied to the clock terminal of the D flip-flop 284 after being inverted by an inverter gate 282. Consequently, an output signal (822) having its "1" level from time $C_3$ as shown in FIG. 8 appears at the Q output terminal of this flip-flop 284. This signal (822) is inverted by an inverter gate 285, and the inverted signal is applied to the minus display terminal of a third display units 293 to display the minus sign on this display unit 293. As a result, the display circuit 110 displays "−19" to indicate that the temperature of air is now −19° C.

In the first embodiment described with reference to FIGS. 1 to 8, the phase difference $T_o$ between the ultrasonic wave signal received by the first receiver unit 125 and that received by the second receiver unit 126, that is, the detected phase difference signal (330) shown in FIG. 3 is utilized for the measurement of the temperature of air. In lieu of $T_o$, the time interval $(T_b-T_o)$ obtained by subtracting the phase difference $T_o$ from the pulse interval $T_b$ of the synchronizing signal may be utilized for the temperature measurement. In such a case, however, the time interval $T_1$ is extended with the temperature rise in contrast with the case of the first embodiment. It will be apparent that the same operation as that described hereinbefore can be attained in such a case by reversing the count-up and count-down operation of the up/down counters 261 and 262 which store the data input.

Figure 9:
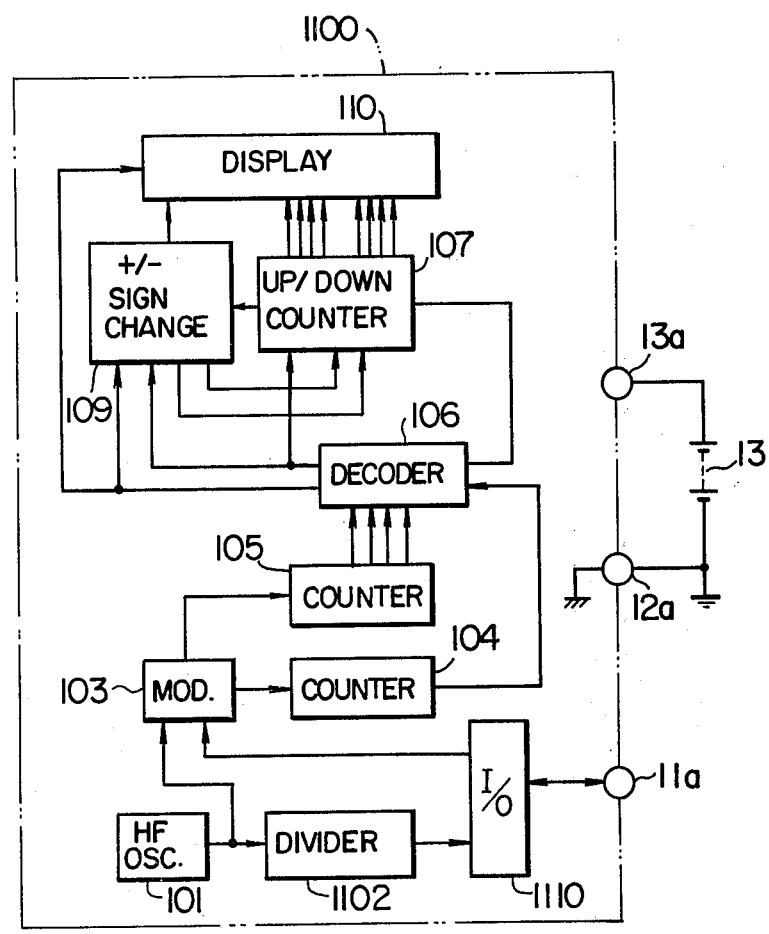
FIGS. 9 and 10 are block diagrams showing the general structure of another embodiment of the apparatus according to the present invention.
Figure 10:
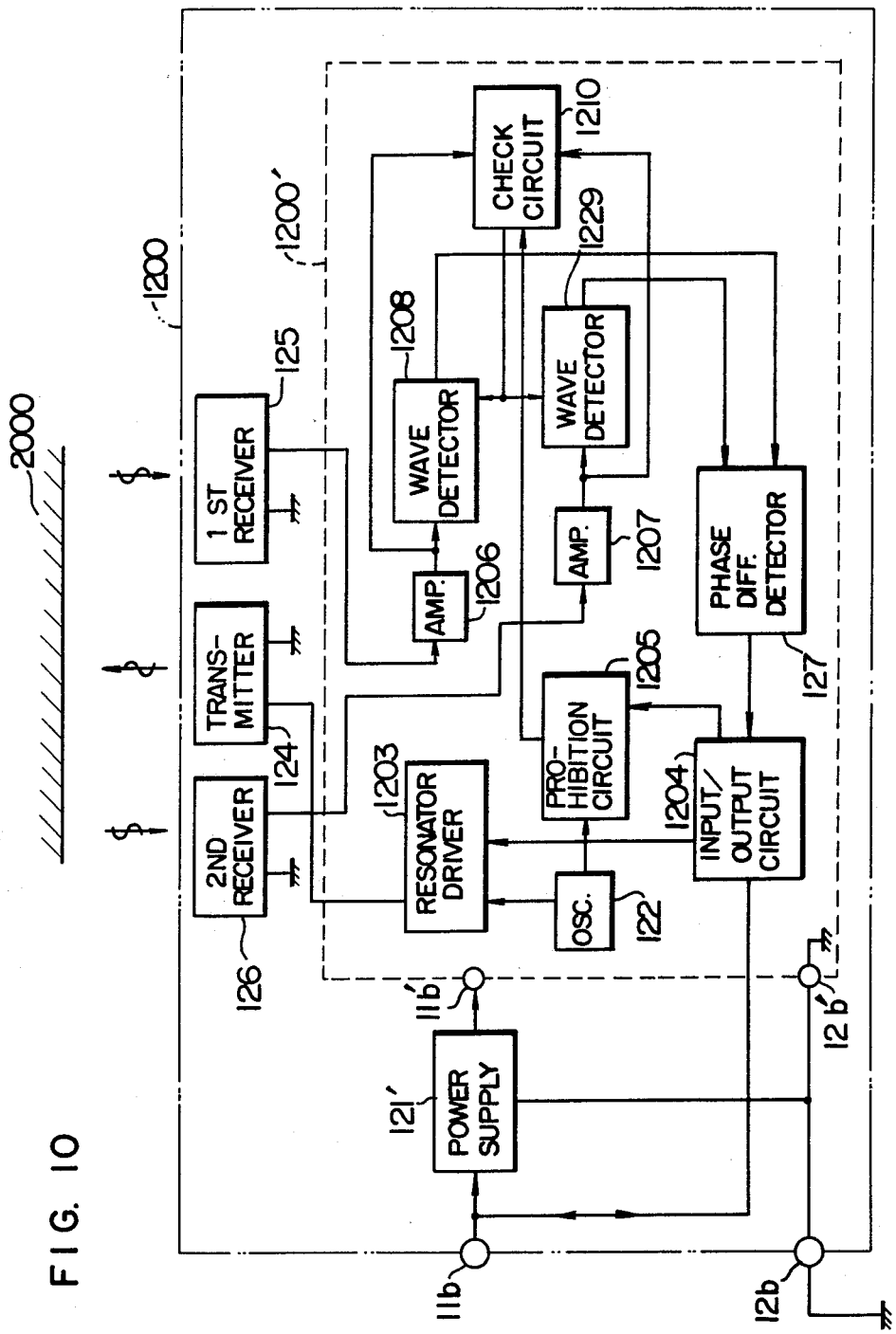

A second embodiment of the present invention will be described with reference to FIGS. 9 to 15. Referring first to FIGS. 9 and 10 which are block diagrams showing the general structure of the second embodiment, the block 1100 in FIG. 9 designates a measuring/display part, and the block 1200 in FIG. 10 designates a sensor part. A signal line (not shown) connects a terminal 11a of the measuring/display part 1100 to a terminal 11b of the sensor part 1200. This signal line serves to transmit information signals between the sensor part 1200 and the measuring/display part 1100 and also to supply required power to electronic components of the sensor part 1100. The reference numeral 2000 designates a freely selected reflector.

The measuring/display part 1100 comprises a high-frequency oscillator 101 oscillating at a predetermined high frequency, and a frequency divider circuit 1102 dividing the frequency of the high-frequency oscillation output signal of the oscillator 101 to produce an instruction signal for driving an ultrasonic wave resonator in the sensor part 1200 for a predetermined period of time. A modulator circuit 103 modulates the high-frequency oscillation output signal of the oscillator 101 by a detected phase difference signal applied from the sensor part 1200. The modulator circuit 103 is connected to an accumulation counter circuit 104 which generates an output pulse each time it counts a predetermined number of pulses of the modulated pulse signal. The modulator circuit 103 is also connected to a time counter circuit 105 which generates its output pulse at a constant time interval, and this constant time signal is applied to a decoder circuit 106 which decodes the input to produce a store signal and a clear signal. An up/down counter circuit 107 counts the output pulses of the accumulation counter circuit 104. A +/− sign change circuit 109 discriminates whether the temperature of a propagation medium such as air is plus or minus, and selects the sign "+" or "−" to be displayed on a display circuit 110 which displays the temperature of air. An input/output circuit 1110 applies the instruction signal to the sensor part 1200 and receives the detected phase difference signal applied from the sensor part 1200.

The sensor 1200 comprises an ultrasonic wave signal transmitter unit 124. The ultrasonic wave signal transmitted from the transmitter unit 124 is reflected back from the reflector 2000 to be received by a first ultrasonic wave signal receiver unit 125 and a second ultrasonic wave signal receiver unit 126 spaced apart from each other by a predetermined distance in the direction of transmission of the ultrasonic wave signal. The phase difference between the ultrasonic wave signal received by the first receiver unit 125 and that received by the second receiver unit 126 is detected to measure the temperature of air between the sensor part 1200 and the reflector 2000. A regulated power supply circuit 121' is connected to the signal line for producing power required by the electronic components of the sensor part 1200. A driver oscillator circuit 122 produces a drive frequency of, for example, 40 kHz for driving the ultrasonic wave resonator in the transmitter unit 124. A resonator driver circuit 1203 drives the resonator for a predetermined period of time in response to the application of the instruction signal from the measuring/display part 1100. An input/output circuit 1204 receives the instruction signal applied from the measuring/display part 1100 and transmits the detected phase difference signal representing the temperature of air to the measuring/display part 1100. A prohibition circuit 1205 is provided so that the ultrasonic wave signal transmitted from the transmitter unit 124 and reflected back from the reflector 2000 can only be received by the first and second receiver units 125 and 126. This prohibition circuit 1205 is unnecessary when the receiver units 125 and 126 are disposed opposite to the transmitter unit 124 without the provision of the reflector 2000 shown in FIG. 10. An amplifier circuit 1206 amplifies the signal received by the first receiver unit 125, and a waveform detector circuit 1208 connected to the amplifier circuit 1206 detects the receiver output signal waveform of predetermined sound pressure level when the first receiver unit 125 is stabilized. Another amplifier circuit 1207 amplifies the signal received by the second receiver unit 126, and another waveform detector circuit 1209 connected to the amplifier 1207 detects the receive output signal waveform of predetermined sound pressure level when the second receiver unit 126 is stabilized. A check circuit 1210 is provided to check the fact that the ultrasonic wave signal transmitted from the transmitter unit 124 and reflected back from the reflector 2000 has been received by the first and second receiver units 125 and 126. A phase difference detector circuit 127 detects the phase difference between the output signals of the waveform detector circuits 1208 and 1209 after the first and second receiver units 125 and 126 have been stabilized to provide the output signals of predetermined sound pressure level.

Figure 11:
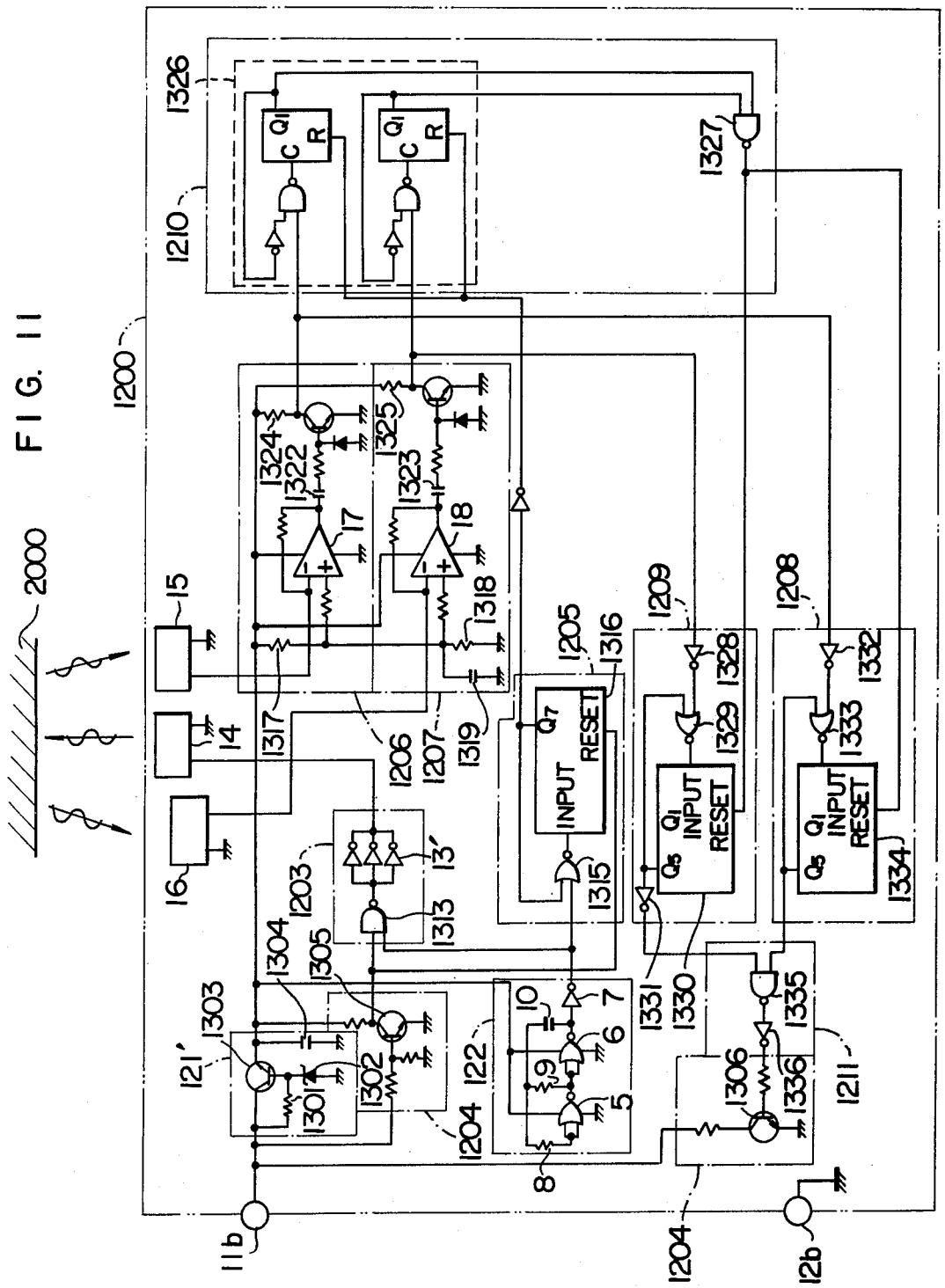
FIG. 11 is an electrical connection diagram showing the detailed circuit structure of the sensor part shown in FIG. 10.
Figure 12:
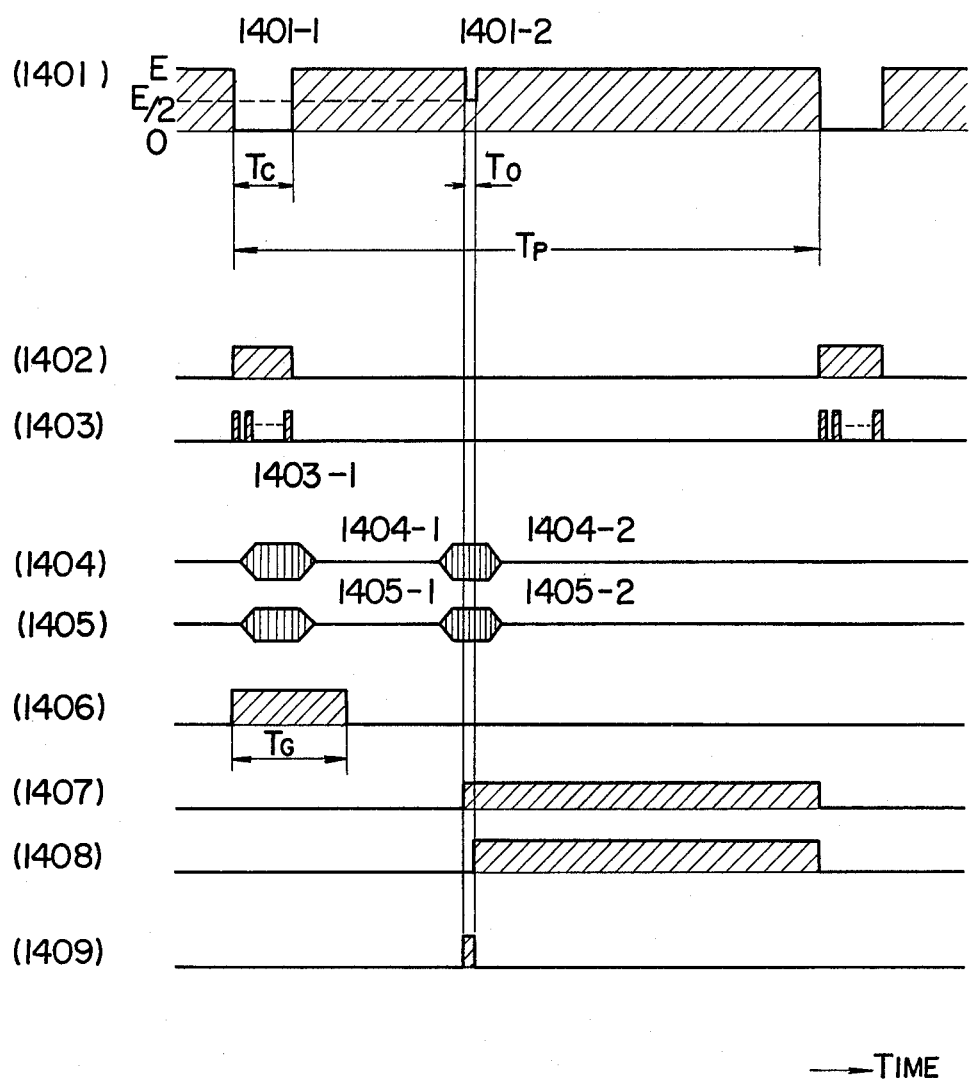
FIGS. 12 and 13 are signal waveform diagrams illustrating the operation of the sensor part shown in FIG. 11.
Figure 13:
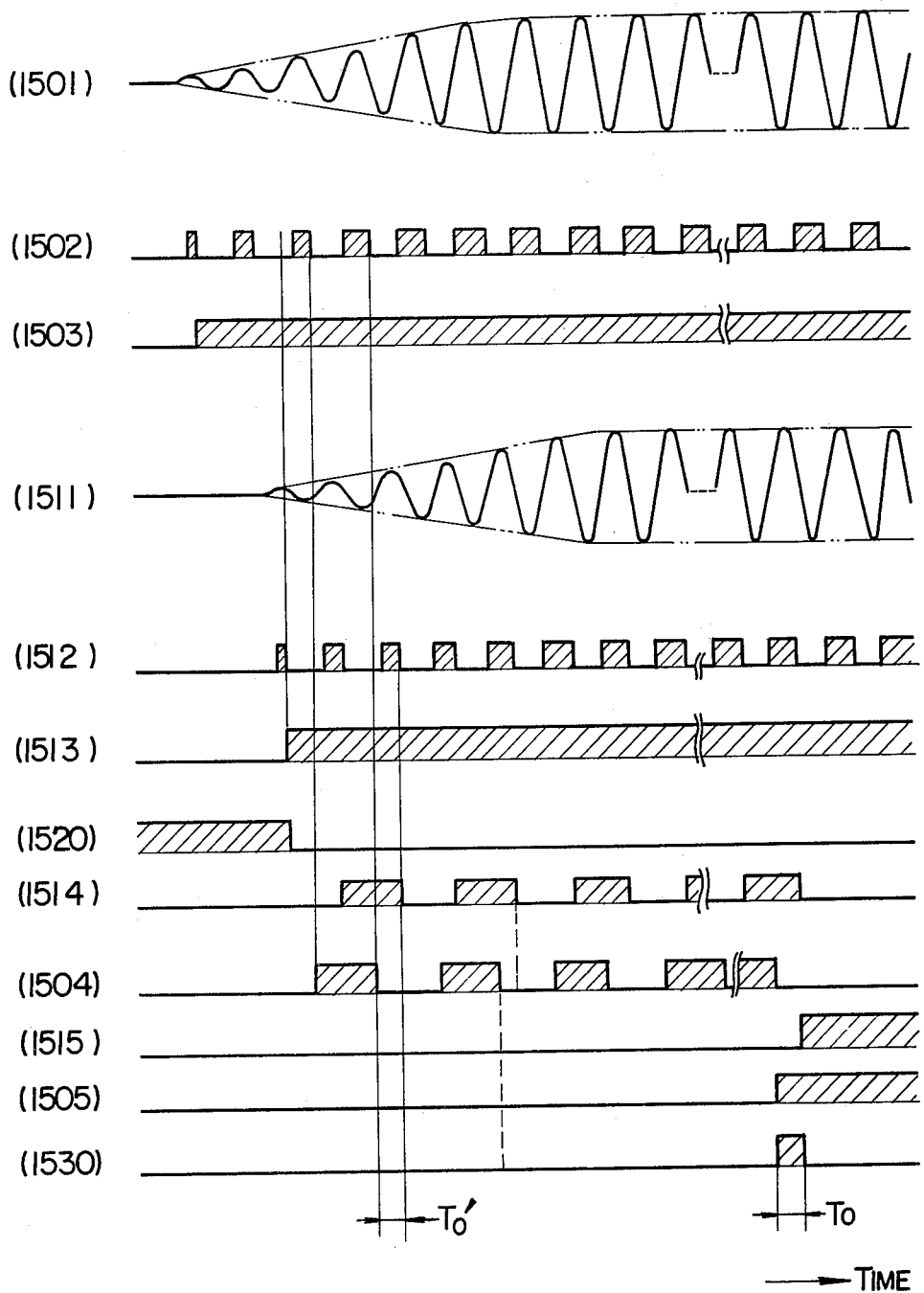
Figure 14:
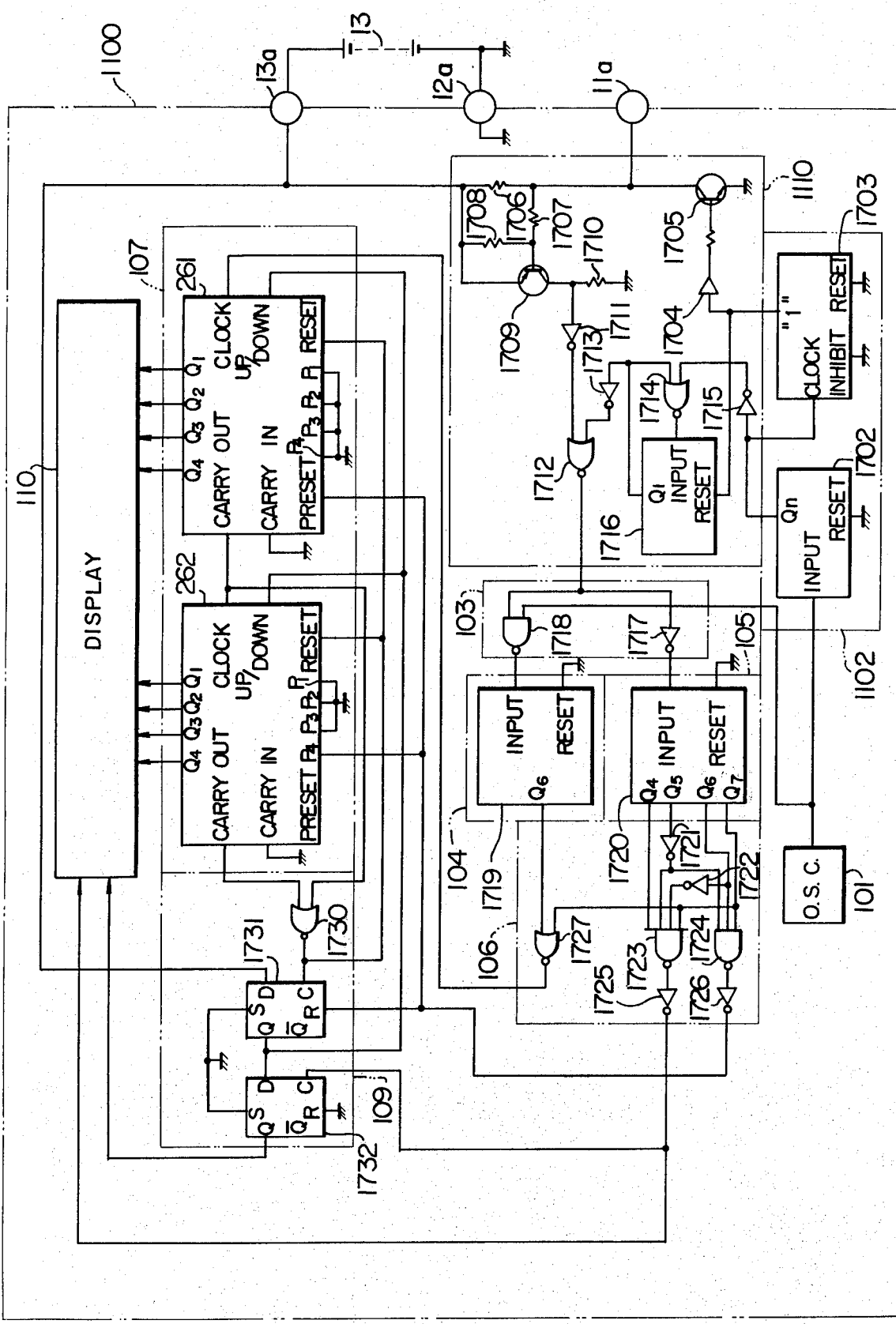
FIG. 14 is an electrical connection diagram showing the detailed circuit structure of the measuring/display part shown in FIG. 9.

The detailed structure and operation of the sound embodiment of the present invention will be described with reference to FIGS. 11 and 14 showing electrical connection diagrams and FIGS. 12 and 13 showing operating signal waveforms.

Referring first to FIG. 11 which is an electrical connection diagram of the sensor part 1200, a voltage waveform (1401) as shown in FIG. 12 appears at the terminal 11b. This voltage waveform (1401) includes an instruction signal (1401-1) which is produced in the measuring/display part 1100 for driving the resonator in the transmitter unit 124 during a time interval $T_c$. The voltage waveform (1401) further includes a signal (1401-2) which is produced in the sensor part 1200 and has a half level of a power supply voltage of E volts during a time interval $T_o$ corresponding to the temperature of a propagation medium which is air. (In the present embodiment, the power source is a car battery of 12 volts). The voltage waveform (1401) shown in FIG. 12 is applied to the regulated power supply circuit 121' composed of a resistor 1301, a zener diode 1302, a transistor 1303 and a capacitor 1304, and a regulated dc voltage (of 8 volts in this embodiment) appears from the regulated power supply circuit 121'. In the voltage waveform (1401), the time interval $T_p$ is sufficiently longer than the time interval $T_c$. (In this embodiment, $T_p$ is selected relative to $T_c$ to provide the ratio $T_c/T_p = 1/10$.) The dc voltage derived from the voltage waveform (1401) supplies required power to all the electronic components of the sensor part 1200.

The voltage waveform (1401) is also applied to the base of a transistor 1305 in the input/output circuit 1204, and the instruction signal (1402) shown in FIG. 12 appears at the collector of the transistor 1305 to be applied to one of the input terminals of a NAND gate 1313 in the resonator driver circuit 1203. The output signal of the oscillator circuit 122 oscillating at the resonator drive frequency is applied to the other input terminal of the NAND gate 1313. This oscillator circuit 122 is a known one which is composed of resistors 8 and 9, a capacitor 10, and gates 5, 6 and 7. The output signal of the NAND gate 1313 is applied to three parallel-connected inverter gates 13' to be subjected to current amplification, and an output signal (1403) as shown in FIG. 12 appears from the resonator driver circuit 1203 to drive the resonator of a transmitter 14 in the ultrasonic wave signal transmitter unit 124. Signal waveforms (1404) and (1405) as shown in FIG. 12 represent those of the ultrasonic wave signal transmitted from the transmitter 14 and received by a fist receiver 15 and a second receiver 16 in the first and second receiver units 125 and 126 respectively. Signals (1404-1) and (1405-1) in the received signal waveforms (1404) and (1405) are unnecessary portions since the ultrasonic wave signal transmitted from the transmitter 14 is directly received by the first and second receivers 15 and 16 to provide such signal portions. On the other hand, signals (1404-2) and (1405-2) in the received signal waveforms (1404) and (1405) are normal or desired portions since the ultrasonic wave signal transmitted from the transmitter 14 and reflected back from the reflector 2000 is received by the first and second receivers 15 and 16 to provide such signal portions. Thus, a time signal (1406) as shown in FIG. 12 is produced by the prohibition circuit 1205 composed of a NOR gate 1315 and a counter 1316, and this signal (1406) is applied to the check circuit 1210 to prohibit the operation of the check circuit 1210 during the time interval $T_G$ shown in FIG. 12, so that the reflected ultrasonic wave signal can only be detected. The counter 1316 employed in this embodiment to provide the signal (1406) shown in FIG. 12 is a commonly known one of model COS/MOS CD4024 manufactured by the RCA Corporation in U.S.A.

The desired signal (1404-2) received by the first receiver 15 is amplified by an amplifier 17 in the amplifier circuit 1206, and the desired signal (1405-2) received by the second receiver 16 is amplified by an amplifier 18 in the amplifier circuit 1207. These amplified signal waveforms are shown in an enlarged scale by (1501) and (1511) respectively in FIG. 13. The output signal (1501) of the amplifier 17 is applied through a capacitor 1322 to the base of a transitor 1324, and a signal (1502) as shown in FIG. 13 appears at the collector of the transistor 1324. This signal (1502) is applied to one of flip-flops constituting a counter 1326 in the check circuit 1210, and a signal (1503) as shown in FIG. 13 appears at the output terminal $Q_1$ of the flip-flop. It will be seen in FIG. 13 that the signal (1503) takes its "1" level after the application of the first pulse of the received signal to indicate that the first receiver 15 has received the desired ultrasonic wave signal. The output signal (1511) of the amplifier 18 is similarly applied through a capacitor 1323 to the base of a transistor 1325, and a signal (1512) as shown in FIG. 13 appears at the collector of the transistor 1325. This signal (1512) is applied to the other flip-flop of the counter 1326 in the check circuit 1210, and a signal (1513) as shown in FIG. 13 appears at the output terminal $Q_1$ of the flip-flop. It will also be seen in FIG. 13 that the signal (1513) takes its "1" level after the application of the first pulse of the received signal to indicate that the desired ultrasonic wave signal has been received by the second receiver 16. This counter 1326 is preferably a counter of model CD4520B manufactured by the RCA Corporation in U.S.A.

The signals (1503) and (1513) are applied to a NAND gate 1327 in the check circuit 1210, and an output signal (1520) as shown in FIG. 13 appears from the NAND gate 1327. This signal (1520) is applied to the reset terminal of a counter 1334 in the first waveform detector circuit 1208 and to the reset terminal of a counter 1330 in the second waveform detector circuit 1209. These counters 1334 and 1330 start their counting operation from the time at which both the first and second receivers 15 and 16 have received the desired ultrasonic wave signal. The output signal (1502) of the amplifier circuit 1206 connected to the first receiver 15 is applied to the count input terminal of the counter 1334 through an inverter gate 1332 and a NOR gate 1333, and an output signal (1504) as shown in FIG. 13 appears at the output terminal $Q_1$ of the counter 1334. Similarly, the output signal (1512) of the amplifier circuit 1207 connected to the second receiver 16 is applied to the count input terminal of the counter 1330 through an inverter gate 1328 and a NOR gate 1329, and an output signal (1514) as shown in FIG. 13 appears at the output terminal $Q_1$ of the counter 1330. These signals (1504) and (1514) are used to provide a detected phase difference signal $T_o'$ representing the phase difference between the desired ultrasonic wave signal received by the first receiver 15 and that received by the second receiver 16. However, in the transient state in which the received pressure level does not attain a predetermined value representing a stable level, satisfactory detection of the phase difference will not be achieved due to the instability of environmental conditions. Therefore, $2^m$ pulses ($2^5$ pulses herein) of the input pulse signal are counted, and then, the phase difference is detected in order that the phase difference can be accurately detected after the attainment of the stable predetermined sound pressure level. Thus, an output signal (1505) appearing at the $2^5$ output terminal $Q_5$ of the counter 1334 and an output signal (1515) appearing at the $2^5$ output terminal $Q_5$ of the counter 1330 are applied to a NAND gate 1335 in the phase difference detector circuit 1211, and the output signal of this NAND gate 1335 is applied to an inverter gate 1336 from which an output signal (1530) as shown in FIG. 13 appears. This signal (1530) provides the detected phase difference signal $T_o$. This detected phase difference signal $T_o$ is used to drive a transistor 1306 in the input/output circuit 1204 to provide the signal (1401-2) in the voltage waveform (1401) shown in FIG. 12.

The detailed structure and operation of the measuring/display part 1100 displaying the temperature of air in response to the application of the voltage waveform (1401) shown in FIG. 12 will be described with reference to FIGS. 14 and 15 which are an electrical connection diagram and an operating signal waveform diagram respectively.

Referring to FIG. 14, the high-frequency oscillator circuit 101 generates a high-frequency oscillation pulse signal, the frequency of which is divided by the factor of $2^n$ by a counter 1702 in the frequency divider circuit 1102. A signal (1801) as shown in FIG. 15 appears at the output terminal $Q_n$ of the counter 1702 to be applied to the clock input terminal of a decode counter 1703, and a signal (1802) as shown in FIG. 15 appears at one of the output terminals of this decode counter 1703. This decode counter 1703 is preferably a counter of model CD4017 manufactured by the RCA Corporation in the U.S.A. The output signal (1802) of the decode counter 1703 drives a transistor 1705 through a buffer 1704 in the input/output circuit 1110. Since this transistor 1705 is connected at its collector to the terminal 11a connected to the information signal line, a signal (1803) as shown in FIG. 15 appears at the terminal 11a and includes the detected phase difference signal $T_o$ produced in and applied from the sensor part 1200. It will be apparent that this signal (1803) is the same as the signal (1401) shown in FIG. 12.

Figure 15:
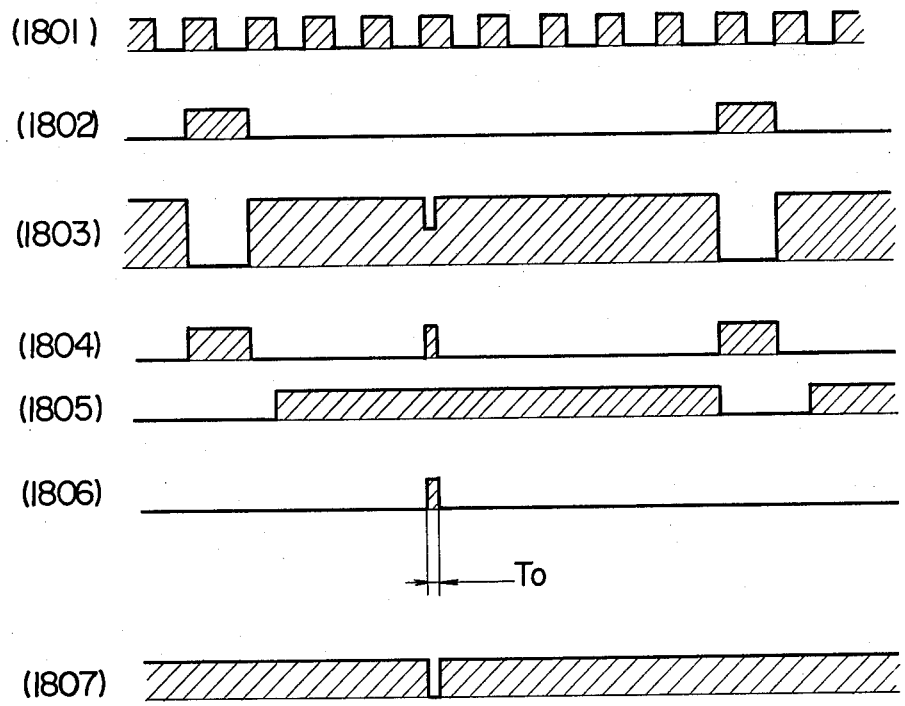
FIG. 15 is a signal waveform diagram illustrating the operation of the measuring/display part shown in FIG. 14.

The signal (1803) appearing at the terminal 11a is applied through a resistor 1707 to the base of a transistor 1709 in the input/output circuit 1110, and a signal (1804) as shown in FIG. 15 appears at the collector of this transistor 1709. This signal (1804) is applied to one of the input terminals of a NOR gate 1712 through an inverter gate 1711. The signal (1802) shown in FIG. 15 is also applied to a counter 1716 through an inverter gate 1715 and a NOR gate 1714, and the output signal of the counter 1716 is passed through an inverter gate 1713 to provide a signal (1805), as shown in FIG. 15, which is applied to the other input terminal of the NOR gate 1712. Consequently, an output signal (1806) as shown in FIG. 15 appears from the NOR gate 1712, and this signal (1806) is the detected phase difference signal $T_o$ representing the temperature of air and applied from the sensor part 1200. The detected phase difference signal $T_o$ is applied to the modulator circuit 103, and an output signal (1807) as shown in FIG. 15 appears from an inverter gate 1717 in the modulator circuit 103. This output signal (1807) is an inverted equivalent of the detected phase difference signal $T_o$. It will be apparent that this signal (1807) is the same as the signal (501) (FIG. 5) in the first embodiment shown in FIG. 2.

The modulator circuit 103, counter circuits 104 and 105, decoder circuit 106, up/down counter circuit 107, sign change circuit 109, and display circuit 110 shown in FIG. 14 are the same as or equivalent to those in the first embodiment shown in FIGS. 2A and 2B, and therefore, it is unnecessary to describe the operation of these circuits in further detail.

It will be understood from the above description that the second embodiment of the present invention can also accurately and stably measure and display the temperature of a propagation medium existing between the reflector and the sensor part including the transmitter and receivers. It is apparent that the reflector may be removed, and the receivers may be disposed opposite to the transmitter in this second embodiment too.

Figure 16:
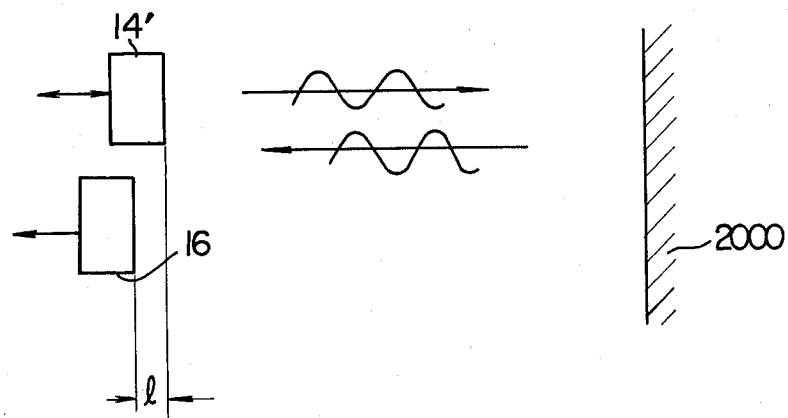
FIG. 16 is a signal waveform diagram illustrating the operation of still another embodiment of the apparatus according to the present invention.

A modification of the first and second embodiments is shown in FIG. 16. In this modification, the receiver 15 is eliminated, and a transmitter/receiver 14' is provided so that the ultrasonic wave signal transmitted from the transmitter/receiver 14' can be received by the transmitter/receiver 14' and receiver 16. It is apparent that the effect of this modification is similar to that of the aforementioned embodiments.

In the aforementioned embodiments of the present invention, the pulses of the modulated pulse signal output of the modulator circuit 103 are counted by the accumulation counter circuit 104 which generates an output pulse when it counts a predetermined number of pulses, and the time or mean-value counter circuit 105 computes the mean value of the pulses of the modulated pulse signal for a predetermined period of time, the mean-value signal thus obtained being applied to the up/down counter circuit 107 for driving the display circuit 110 so that the mean value can be displayed for the purpose of stable display operation. However, the computation of the mean value may not be carried out, and the modulated pulse signal may be directly applied to the up/down counter circuit 107 to be counted thereby.

In the aforementioned embodiments of the present invention, the output of the up/down counter circuit 107 is applied to the display circuit 110 for the digital display of the detected temperature. However, an analog display means such as a moving-coil type ammeter may be employed in place of the digital display circuit 110.

Further, although the output of the up/down counter circuit 107 is used for displaying the temperature of air in the aforementioned embodiments of the present invention, the display of the temperature of air is not essentially required, and this output may be applied to an external electronic control system so that the apparatus may merely operate as a temperature sensor. In such a case, the frequency of the high-frequency pulse signal applied to the modulator circuit 103 is preferably selected to be sufficiently high so that the temperature can be detected with higher accuracy. When the frequency of this high-frequency pulse signal is suitably adjusted to match the quick detection response, the use of this temperature sensor ensures quick response of the electronic control system against temperature variations.

In the aforementioned embodiments of the present invention, the temperature of air is measured by way of example. It is apparent, however, that the medium whose temperature is to be measured is not limited to air, and the medium may be any one of mediums capable of propagating ultrasonic waves, including, for example, a gas such as oxygen, nitrogen or helium, a liquid such as water or oil, and a solid such as iron or wood.

Further, although the driver oscillator circuit 122 is disposed in the sensor part to provide the drive frequency for driving the resonator in the transmitter unit in the aforementioned embodiments of the present invention, such a drive frequency may be generated in the measuring/display part and transmitted to the sensor part so as to eliminate the driver oscillator circuit 122.

We claim:

1. An apparatus for measuring the temperature of an ultrasonic wave propagation medium comprising:

transmitter means for transmitting an ultrasonic wave into an ultrasonic wave propagation medium, said transmitter means including an oscillator for producing periodic pulses at a fixed frequency, and an ultrasonic transducer connected to said oscillator for transducing each of said periodic pulses into said ultrasonic wave;

first receiver means positioned along the sound propagation path in said propagation medium for receiving said ultrasonic wave transmitted from said transmitter means and synchronously producing a first electric output signal indicative of the received ultrasonic wave;

second receiver means positioned along said sound propagation path in said propagation medium and distanced from said first receiver means for receiving said ultrasonic wave transmitted from said transmitter means and synchronously producing a second electric output signal indicative of the received ultrasonic wave, each of said first and second receiver means including an ultrasonic transducer for transducing the received ultrasonic waves into corresponding electric signal trains, and an amplifier connected to the corresponding ultrasonic transducer for amplifying the corresponding electric signal trains to produce trains of said corresponding electric output signal;

detector means for detecting the phase difference between said first and second electric output signals produced respectively from said first and second receiver means and producing a pulse signal having a time interval equal to the detected phase difference, said detector means including a frequency divider connected to said amplifier of said first receiver means for dividing the trains of said first electric output signal in frequency, and a logic circuit connected to said amplifier of said second receiver means and said frequency divider for subjecting the trains of said second electric output signal and the trains of frequency divider output signal to a predetermined logic operation, whereby said pulse signal having the phase difference time interval is produced relative to a predetermined number of productions of said first electric output signal; and measuring means for measuring said time interval of said pulse signal produced from said detector means and providing an output indicative of the temperature of said propagation medium.

2. An apparatus according to claim 1 further comprising:

a transistor connected to said logic circuit of said detector means for being rendered conductive during said phase difference time interval of said pulse signal;

a signal transmission line connected to said transistor and said measuring means for transmitting the output signal of said transistor to said measuring means; and an electric power circuit including a capacitor and a diode, said capacitor being connected to supply said transmitter means, said first and second receiver means and said detector means with the electric power stored therein, and said diode being connected to said signal transmission line and said capacitor for preventing the discharge of said capacitor during the conduction of said transistor;

and wherein said signal transmission line is connected to a source of electric power connected to supply said measuring means with electric power, said signal transmission line being effective to charge said capacitor by said source of electric power during the nonconduction of said transistor.

3. An apparatus for measuring the temperature of an ultrasonic wave propagation medium comprising:

transmitter means for transmitting an ultrasonic wave into an ultrasonic wave propagation medium, said transmitter means including an oscillator for producing periodic pulses at a fixed frequency, an ultrasonic transducer connected to said oscillator for transducing each of said periodic pulses into said ultrasonic wave, another oscillator for producing another periodic pulses at another fixed frequency much lower than that of said periodic pulses of said oscillator, and a gate for gating said periodic pulses in response to said another periodic pulses, said gate being connected to said ultrasonic transducer so that said ultrasonic wave having said fixed frequency of said periodic pulses is transmitted intermittently at said another fixed frequency of said another periodic pulses;

first receiver means positioned along the sound propagation path in said propagation medium for receiving said ultrasonic wave transmitted from said transmitter means and synchronously producing a first electric output signal indicative of the received ultrasonic wave;

second receiver means positioned along said sound propagation path in said propagation medium and distanced from said first receiver means for receiving said ultrasonic wave transmitted from said transmitter means and synchronously producing a second electric output signal indicative of the received ultrasonic wave, each of said first and second receiver means including an ultrasonic transducer for transducing the received ultrasonic waves into corresponding electric signal trains, and an amplifier connected to said ultrasonic transducer for amplifying the corresponding electric signal trains to produce trains of said corresponding electric output signal;

a reflection medium provided in said sound propagation path to face said ultrasonic transducer of said transmitter means, said ultrasonic transducers of said first and second receiver means being arranged to face said reflection medium;

detector means for detecting the phase difference between said first and second electric output signals produced respectively from said first and second receiver means and producing a pulse signal having a time interval equal to the detected phase difference; and measuring means for measuring said time interval of said pulse signal produced from said detector means and providing an output indicative of the temperature of said propagation medium.

4. An apparatus according to claim 3, wherein said detector means includes:

a first counter for counting said first electric signal to produce a first counter output indicative of a predetermined number of counts;

a second counter for counting said second electric signal to produce a second counter output indicative of said predetermined number of counts;

a prohibition circuit for prohibiting the counting operations of said first and second counters in response to said another periodic pulses of said another oscillator; and a logic circuit for subjecting said first and second counter outputs to a predetermined logic operation, said logic circuit producing said pulse signal having said phase difference time interval.

5. An apparatus according to claim 4 further comprising:

a first transistor connected to said logic circuit of said detector means for being rendered conductive during said phase difference time interval of said pulse signal;

a transmission line connected to said first transistor and said measuring means for transmitting the output signal of said first transistor to said measuring means; and an electric power circuit including a capacitor and a second transistor, said capacitor being connected to supply said transmitter means, said first and second receiver means and said detector means with the electric power stored therein, and said second transistor being connected to said signal transmission line and said capacitor for preventing the discharge of said capacitor during the conduction of said second transistor;

and wherein said signal transmission line is connected to a source of electric power connected to supply said measuring means with electric power, said signal transmission line being effective to charge said capacitor by said source of electric power during the nonconduction of said first transistor.

6. An apparatus for measuring the temperature of an ultrasonic wave propagation medium comprising:

transmitter means for transmitting an ultrasonic wave into an ultrasonic wave propagation medium;

first receiver means positioned along the sound propagation path in said propagation medium for receiving said ultrasonic wave transmitted from said transmitter means and synchronously producing a first electric signal indicative of the received ultrasonic wave;

second receiver means positioned along said sound propagation path in said propagation medium and distanced from said first receiver means for receiving said ultrasonic wave transmitted from said transmitter means and synchronously producing a second electric signal indicative of the received ultrasonic wave;

detector means for detecting the phase difference between said first and second electric signals produced respectively from said first and second receiver means and producing a pulse signal having a time interval equal to the detected phase difference;

measuring means for measuring said time interval of said pulse signal produced from said detector means and providing an output indicative of the temperature of said propagation medium;

a source of electric power connected to said measuring means for supplying said measuring means with electric power;

a first semiconductor connected between said detector means and said measuring means for being rendered conductive during said phase difference time interval of said pulse signal;

a signal transmission line connected between said first semiconductor and said measuring means for transmitting the output signal of said first semiconductor to said measuring means, said signal transmission line connecting said first semiconductor to said source of electric power in serial relation;

a capacitor connected in parallel with said first semiconductor for supplying said transmitter means, said first and second receiver means and said detector means with electric power stored therein; and a second semiconductor connected between said first semiconductor and said capacitor for charging said capacitor by said source of electric power through said signal transmission line and preventing the discharge of said capacitor during the nonconduction and conduction of said first semiconductor.

* * * * *